United States Patent
Hashimoto et al.

(10) Patent No.: US 9,517,690 B2
(45) Date of Patent: Dec. 13, 2016

(54) VEHICLE DRIVING CONTROL DEVICE

(71) Applicant: TOYOTA JIDOSHA KABUSHIKI KAISHA, Toyota-shi (JP)

(72) Inventors: Hiroto Hashimoto, Susono (JP); Yuji Iwase, Mishima (JP); Hiroaki Ebuchi, Hadano (JP); Hidekazu Nagai, Susono (JP); Shotaro Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/940,617

(22) Filed: Nov. 13, 2015

(65) Prior Publication Data

US 2016/0144846 A1 May 26, 2016

(30) Foreign Application Priority Data

Nov. 20, 2014 (JP) .................. 2014-235362

(51) Int. Cl.
| | |
|---|---|
| *B60W 10/08* | (2006.01) |
| *B60W 20/00* | (2016.01) |
| *B60K 6/20* | (2007.10) |
| *B60K 6/445* | (2007.10) |
| *F16H 3/72* | (2006.01) |
| *B60K 6/38* | (2007.10) |

(52) U.S. Cl.
CPC .............. *B60K 6/445* (2013.01); *B60W 20/40* (2013.01); *F16H 3/727* (2013.01); *B60K 2006/381* (2013.01); *Y10S 903/903* (2013.01)

(58) Field of Classification Search
CPC ......... B60W 10/08; B60W 20/00; B60K 6/20; Y10S 903/903
USPC .......................................... 701/22
See application file for complete search history.

(56) References Cited

U.S. PATENT DOCUMENTS

| | | | |
|---|---|---|---|
| 8,796,960 B2 | 8/2014 | Okamura et al. | |
| 2013/0002174 A1* | 1/2013 | Okamura ................ | B60L 15/08 318/139 |

FOREIGN PATENT DOCUMENTS

| | | |
|---|---|---|
| JP | 2003-18704 A | 1/2003 |
| JP | 5413505 | 2/2014 |

* cited by examiner

*Primary Examiner* — Anne M Antonucci
(74) *Attorney, Agent, or Firm* — Oblon, McClelland, Maier & Neustadt, L.L.P.

(57) ABSTRACT

A vehicle driving control device for a vehicle includes a control unit configured to stop operation of an electric motor driving device driving an electric motor at a time a rotary element is fixed to be unable to rotate by an engagement by an engaging mechanism, and to recover the operation of the electric motor driving device at a time a predetermined condition based on a parameter relating to a driving of the vehicle is satisfied before releasing the engagement by the engaging mechanism.

4 Claims, 5 Drawing Sheets

VEHICLE DRIVING CONTROL DEVICE

CROSS-REFERENCE TO RELATED APPLICATION(S)

The present application claims priority to and incorporates by reference the entire contents of Japanese Patent Application No. 2014-235362 filed in Japan on Nov. 20, 2014

BACKGROUND OF THE INVENTION

1. Field of the Invention

The present invention relates to a vehicle driving control device which stops operation of an electric motor driving device which drives an electric motor when rotation of the electric motor is mechanically fixed by a lock mechanism.

2. Description of the Related Art

A vehicle driving control device which reduces power consumption by an electric motor by stopping switching operation of an inverter which drives the electric motor when rotation of the electric motor is mechanically fixed by a lock mechanism is conventionally known (refer to Japanese Patent No. 5413505 (paragraphs 0172 and 0175 to 0177)).

However, the conventional driving control device restarts the switching operation of the inverter after receiving a release request of the lock mechanism. Therefore, according to the conventional driving control device, it takes time for the electric motor to output torque after receiving the release request of the lock mechanism and there is a room for improvement of responsiveness to the release request of the lock mechanism.

There is a need for a vehicle driving control device capable of improving the responsiveness to the release request of the lock mechanism.

SUMMARY OF THE INVENTION

It is an object of the present invention to at least partially solve the problems in the conventional technology.

A vehicle driving control device for a vehicle according to one aspect of the present invention, the vehicle including: an engine and an electric motor a as power sources; a differential mechanism whose rotary elements including three rotary elements connected to the engine, the electric motor and a driving shaft, respectively, and performing a differential operation to each another; a rotary engagement element rotating integrally with a rotary element other than the rotary element connected to the engine and the rotary element connected to the driving shaft; a fixed engagement element fixed so as to be unable to rotate; a meshing engaging mechanism selectively fixing the rotary element rotating integrally with the rotary engagement element to be unable to rotate by engaging the rotary engagement element with the fixed engagement element or releasing the engagement of the rotary engagement element with the fixed engagement element; and an electric motor driving device driving the electric motor, includes: a control unit configured to stop operation of the electric motor driving device at a time the rotary element is fixed to be unable to rotate, and to recover the operation of the electric motor driving device at a time a predetermined condition based on a parameter relating to a driving of the vehicle is satisfied before releasing the engagement by the engaging mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

DETAILED DESCRIPTION OF THE PREFERRED EMBODIMENTS

A vehicle driving control device being one embodiment of the present invention is hereinafter described with reference to the drawings.

Configuration of Driving Device

A configuration of a driving device to which a vehicle driving control device being one embodiment of the present invention is applied is first described.

Figure 1:
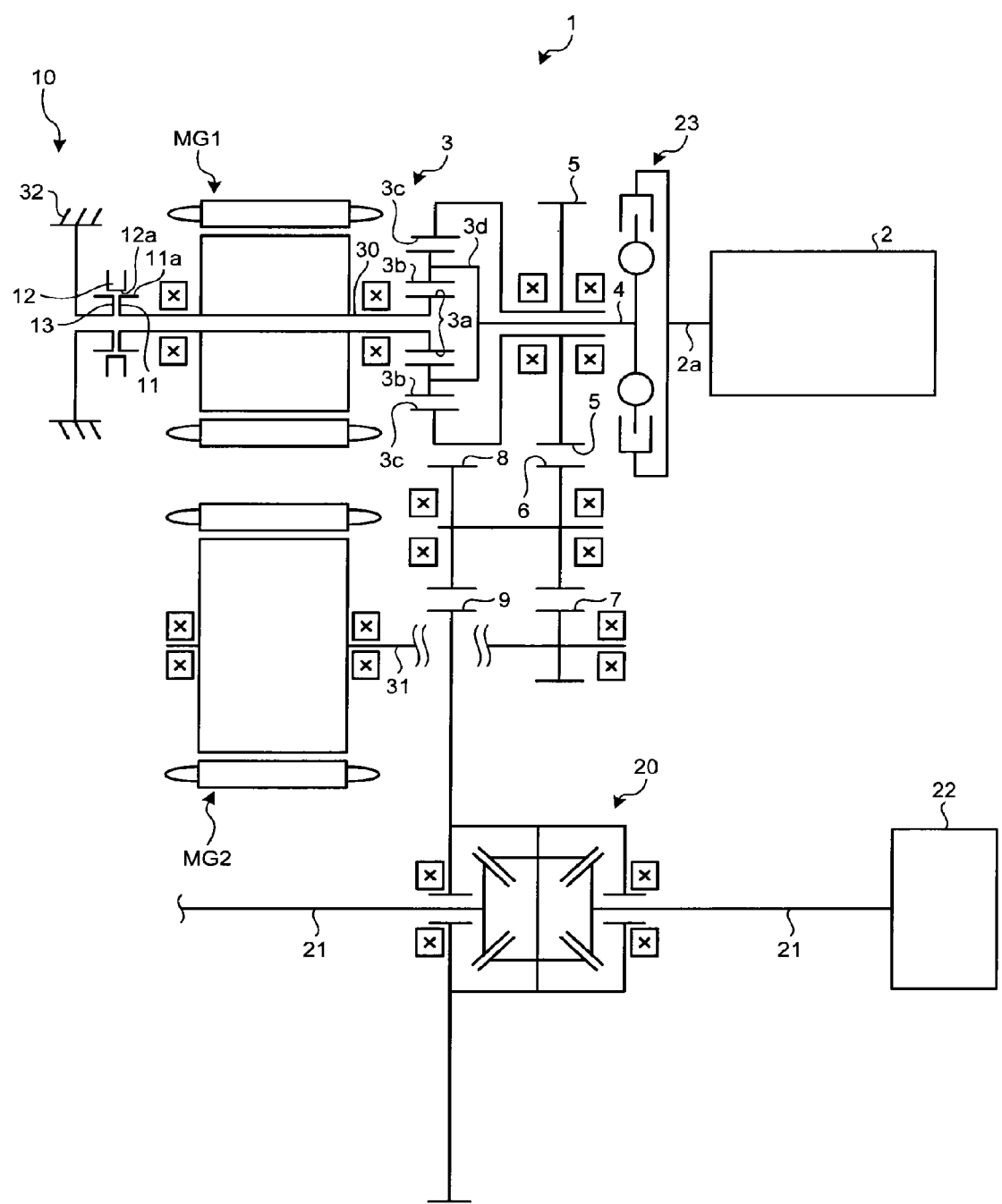
FIG. 1 is a view illustrating a first configuration example of a driving device to which a vehicle driving control device being one embodiment of the present invention is applied.
Figure 2:
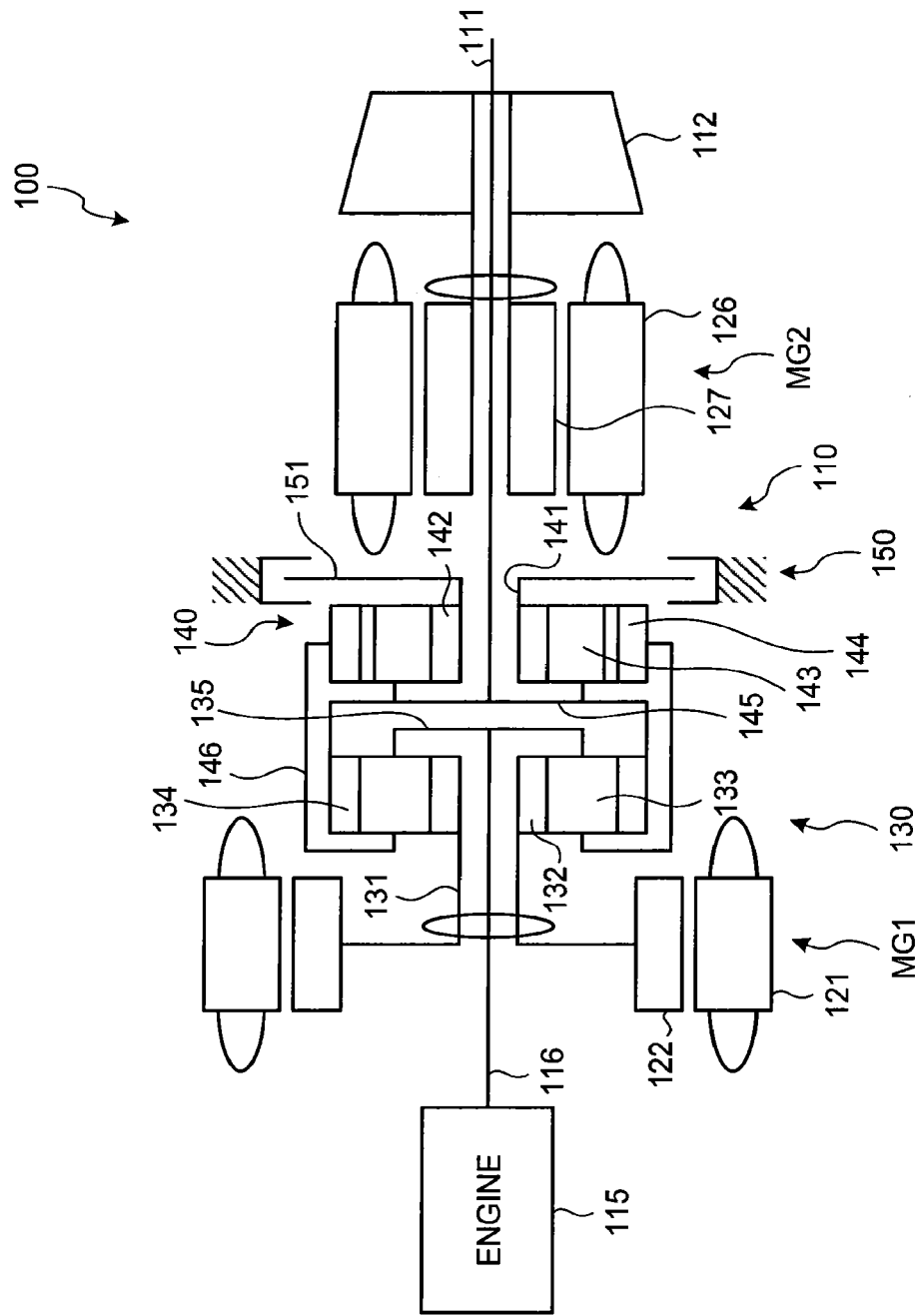
FIG. 2 is a view illustrating a second configuration example of the driving device to which the vehicle driving control device being one embodiment of the present invention is applied.

The vehicle driving control device being one embodiment of the present invention may be applied to the driving device provided with a plurality of power sources including at least one electric motor, the driving device including at least one brake mechanism in a transmission. First and second configuration examples of the driving device to which the vehicle driving control device being one embodiment of the present invention is applied are hereinafter described with reference to FIGS. 1 and 2. FIG. 1 is a view illustrating the first configuration example of the driving device to which the vehicle driving control device being one embodiment of the present invention is applied. FIG. 2 is a view illustrating the second configuration example of the driving device to which the vehicle driving control device being one embodiment of the present invention is applied.

First Configuration Example

As illustrated in FIG. 1, in the first configuration example, a driving device 1 is mounted on a vehicle such that an axial direction thereof is parallel to a vehicle width direction and is provided with an engine 2, a planetary gear mechanism 3, a first motor generator MG1, a second motor generator MG2, and an engagement device 10.

The engine 2 converts combustion energy of fuel to rotary movement of a rotary shaft $2a$ to output in response to a control instruction from the driving control device. The rotary shaft $2a$ of the engine 2 is connected to an input shaft 4 through a damper 23. The rotary shaft $2a$ of the engine 2 is arranged coaxially with the input shaft 4. The input shaft 4 is connected to a carrier 3d of the planetary gear mechanism 3.

The planetary gear mechanism 3 has a function as a power distributing mechanism which distributes power from the engine 2 to an output side and the first motor generator MG1. The planetary gear mechanism 3 is provided with a sun gear 3a, a pinion gear 3b, a ring gear 3c, and the carrier 3d. The sun gear 3a is arranged on an outer side of the input shaft 4 in a radial direction.

The sun gear 3a is arranged coaxially with the input shaft 4 so as to be rotatable. The ring gear 3c is arranged coaxially with the sun gear 3a so as to be rotatable on an outer side of the sun gear 3a in a radial direction. The pinion gear 3b is arranged between the sun gear 3a and the ring gear 3c to mesh with the sun gear 3a and the ring gear 3c. The pinion gear 3b is rotatably supported by the carrier 3d arranged coaxially with the input shaft 4.

The carrier 3d is coupled to the input shaft 4 and integrally rotates with the input shaft 4. According to this, the pinion gear 3b may rotate (revolve) around a central axis of the input shaft 4 and may rotate (rotate) around a central axis of the pinion gear 3b while being supported by the carrier 3d.

The first motor generator MG1 is connected to the sun gear 3a. A rotary shaft 30 of the first motor generator MG1 is arranged coaxially with the input shaft 4 and is connected to the sun gear 3a. According to this, a rotor of the first motor generator MG1 integrally rotates with the sun gear 3a.

A counter drive gear 5 is connected to the ring gear 3c. The counter drive gear 5 is an output gear which integrally rotates with the ring gear 3c. The counter drive gear 5 is arranged so as to be closer to the engine 2 than the ring gear 3c in the axial direction. The ring gear 3c is also an output element capable of outputting rotation input from the first motor generator MG1 or the engine 2 to a side of a drive wheel 22.

The counter drive gear 5 meshes with a counter driven gear 6. A reduction gear 7 of the second motor generator MG2 meshes with the counter driven gear 6. The reduction gear 7 is arranged on a rotary shaft 31 of the second motor generator MG2 and integrally rotates with the rotary shaft 31. That is to say, torque output from the second motor generator MG2 is transmitted to the counter driven gear 6 through the reduction gear 7. The reduction gear 7 having a smaller diameter than that of the counter driven gear 6 decelerates rotation of the second motor generator MG2 to transmit to the counter driven gear 6.

The first and second motor generators MG1 and MG2 are connected to a battery not illustrated through an MG driving device. The first and second motor generators MG1 and MG2 act as electric motors which convert electric power supplied from the battery to mechanical power to output and act as power generators driven by input power to convert the mechanical power to the electric power in response to the control instruction from the driving control device. The electric power generated by the first and second motor generators MG1 and MG2 may be stored in the battery. An AC synchronous motor generator may be used, for example, as each of the first and second motor generators MG1 and MG2.

A drive pinion gear 8 is connected to the counter driven gear 6. The drive pinion gear 8 is arranged coaxially with the counter driven gear 6 and integrally rotates with the counter driven gear 6. The drive pinion gear 8 meshes with a differential ring gear 9 of a differential device 20. The differential device 20 is connected to the drive wheels 22 through right and left drive shafts 21. That is to say, the ring gear 3c is connected to the drive wheel 22 through the counter drive gear 5, the counter driven gear 6, the drive pinion gear 8, the differential device 20, and the drive shaft 21. The second motor generator MG2 arranged so as to be closer to the drive wheel 22 than the ring gear 3c is connected to a power transmission path between the ring gear 3c and the drive wheel 22 and may transmit the power to the ring gear 3c and the drive wheel 22.

Engine torque output from the engine 2 is transmitted to a pair of drive wheels 22 through the planetary gear mechanism 3 as the power distributing mechanism and the differential device 20. The first motor generator MG1 regeneratively generates the electric power by the engine torque distributed by the planetary gear mechanism 3 to be supplied when this acts as the power generator. When the first motor generator MG1 acts as the power generator to perform regenerative control, the planetary gear mechanism 3 is used as a continuously variable transmission. That is to say, the output of the engine 2 is transmitted to the drive wheel 22 after a speed thereof is changed by the planetary gear mechanism 3. Meanwhile, it is possible to control a speed of the engine 2 and control the output to the drive wheel 22 by controlling drive of the second motor generator MG2 or controlling a rotational speed of the first or second motor generator MG1 or MG2.

The first motor generator MG1 is arranged coaxially with the rotary shaft 2a of the engine 2 in this configuration example. The second motor generator MG2 is arranged on the rotary shaft 31 different from the rotary shaft 2a of the engine 2. That is to say, the driving device 1 is of a pluriaxial type in which the input shaft 4 and the rotary shaft 31 of the second motor generator MG2 are arranged on different axes.

In the driving device 1, the planetary gear mechanism 3 is arranged coaxially with the rotary shaft 2a of the engine 2 between the engine 2 and the first motor generator MG1. The engagement device 10 is arranged on a side opposite to the engine 2 across the first motor generator MG1. That is to say, in the driving device 1, the counter drive gear 5, the planetary gear mechanism 3, the first motor generator MG1, and the engagement device 10 are arranged coaxially with the rotary shaft 2a of the engine 2 in this order from a side closer to the engine 2.

The engagement device 10 is coupled to the first motor generator MG1. The engagement device 10 is configured to be able to regulate the rotation of the first motor generator MG1 and is used as a lock mechanism which mechanically fixes the rotation of the first motor generator MG1. Although the engagement device 10 is a meshing engaging mechanism in this configuration example, the present invention is not limited to the meshing engaging mechanism and may also be a frictional engaging mechanism, for example.

When it is required to control the rotational speed of the first motor generator MG1 to 0 when the driving device 1 controls the speed of the engine 2 and controls the output to the drive wheel 22, the rotation of the first motor generator MG1 is mechanically locked by the engagement device 10. Therefore, it becomes not necessary to electrically control the rotational speed of the first motor generator MG1, so that power supply to the first motor generator MG1 becomes not necessary and it is possible to improve fuel efficiency. When the engagement device 10 mechanically locks the rotation of the first motor generator MG1, the planetary gear mechanism 3 no longer acts as the continuously variable transmission, thereby realizing a fixed stage.

In this configuration example, the engagement device 10 is provided with a piece 11, a sleeve 12, and a hub bracket 13. The piece 11 and the sleeve 12 are arranged around the rotary shaft 30 of the first motor generator MG1. The piece 11 interlocks with the rotary shaft 30 to integrally rotate around an axis of the rotary shaft 30. Movement of the piece 11 in an axial direction and a radial direction thereof is regulated. The sleeve 12 is arranged on an outer side of the piece 11 in the radial direction. The sleeve 12 is splined to the hub bracket 13. The hub bracket 13 is fixed to a housing 32 containing components of the driving device 1. That is to say, since the sleeve 12 is splined to the hub bracket 13, this is configured to be movable in the axial direction, and movement thereof in the radial direction and rotation thereof around the axis are regulated.

The piece 11 and the sleeve 12 may engage/disengage an inner peripheral surface of the sleeve 12 with/from an outer peripheral surface of the piece 11 by the movement of the sleeve 12 in the axial direction. A plurality of dog teeth 11a is radially outwardly arranged on the outer peripheral surface of the piece 11 in a circumferential direction around the axis. A plurality of dog teeth 12a is radially inwardly arranged on the inner peripheral surface of the sleeve 12 in the circumferential direction around the axis. The dog teeth 11a and 12a form a meshing dog clutch. The sleeve 12 moves in a direction to approach the piece 11 (engaging direction) and the dog teeth 12a of the sleeve 12 and the dog teeth 11a of the piece 11 are combined to mesh with each other, so that the piece 11 may engage with the sleeve 12. The sleeve 12 is splined to the piece 11, so that the rotary shaft 30 of the first motor generator MG1 interlocking with the piece 11 is fixed and rotation of the rotary shaft 30 may be regulated. The sleeve 12 moves in a direction to separate from the piece (disengaging direction) and the dog teeth 12a of the sleeve 12 are separated from the dog teeth 11a of the piece 11, so that an engaging state of the sleeve 12 with the piece 11 may be released.

Second Configuration Example

As illustrated in FIG. 2, in a second configuration example, a driving device 100 is mounted on a vehicle and includes a transmission 110 to which an engine 115 being an internal combustion engine mounted on the vehicle as a power generating unit at the time of vehicle travel and a second motor generator MG2 mounted on the vehicle as the power generating unit at the time of the vehicle travel as the engine 115 are connected.

The transmission 110 to which the engine 115 and the second motor generator MG2 are connected is provided so as to be able to appropriately output power generated by the engine 115 and the second motor generator MG2 according to a vehicle travel state. A first motor generator MG1 being a power distributing unit which distributes the power when the power of the engine 115 and that of the second motor generator MG2 are output is connected to the transmission 110. The first and second motor generators MG1 and MG2 are well-known motor generators having both functions of an electric motor and a power generator.

The first motor generator MG1 is provided with a stator 121 being a component on a fixed side and a rotor 122 being a component on a rotating side; the rotor 122 of the first motor generator MG1 connected to the transmission 110 is connected to the transmission 110. The stator 121 is fixed to a vehicle body of the vehicle. The second motor generator MG2 is provided with a stator 126 being a component on a fixed side and a rotor 127 being a component on a rotating side as the first motor generator MG1, the stator 126 fixed to the vehicle body and the rotor 127 connected to the transmission 110.

The transmission 110 is provided with a first planetary gear mechanism 130, a second planetary gear mechanism 140, a dog clutch 150 being a meshing engagement device, and a second motor generator transmission unit 112 which connects the rotor 127 of the second motor generator MG2 to an output shaft 111 of the transmission 110. Out of them, the first planetary gear mechanism 130 is provided with a hollow sun gear shaft 131 through which a crankshaft 116 of the engine 115 penetrates provided so as to integrally rotate with the rotor 122 of the first motor generator MG1, a sun gear 132 which integrally rotates with the sun gear shaft 131, a plurality of planetary gears (planetary gears) 133 meshing with the sun gear 132 to revolve around the same, a ring gear 134 provided on an outer side of the planetary gears 133 in a radial direction from an axis of the sun gear shaft 131 to mesh with the planetary gears 133, and a carrier 135 supporting the planetary gears 133 so as to be rotatable around the axis of the sun gear shaft 131 to integrally rotate with the crankshaft 116 of the engine 115.

The second planetary gear mechanism 140 is provided with a hollow sun gear shaft 141 through which an output shaft 111 provided coaxially with the crankshaft 116 penetrates provided so as to integrally rotate with a hub 151 provided as a meshing portion of the dog clutch 150, a sun gear 142 which integrally rotates with the sun gear shaft 141, a plurality of planetary gears 143 meshing with the sun gear 142 to revolve around the same, a ring gear 144 provided on an outer side of the planetary gears 143 in a radial direction from an axis of the sun gear shaft 141 to mesh with the planetary gears 143, and a carrier 145 supporting the planetary gears 143 so as to be rotatable around the axis of the sun gear shaft 141 to integrally rotate with the ring gear 134 of the first planetary gear mechanism 130.

The planetary gear 133 of the first planetary gear mechanism 130 is coupled to the ring gear 144 of the second planetary gear mechanism 140 with a coupling member 146 so as to revolve around the sun gear 132 of the first planetary gear mechanism 130 in conjunction with the rotation of the ring gear 144 of the second planetary gear mechanism 140. Meanwhile, the first and second planetary gear mechanisms 130 and 140 may have the same structure and action of those of the well-known transmission 110, so that detailed description thereof is omitted. Torque of the first motor generator MG1 and torque of the engine 115 may be transmitted to the dog clutch 150 through the first and second planetary gear mechanisms 130 and 140.

The dog clutch 150 is configured to be able to regulate rotation of the first motor generator MG1 and is used as a lock mechanism which mechanically fixes the rotation of the first motor generator MG1. Although an engagement device 10 mechanically fixes the rotation of the first motor generator MG1 by the dog clutch 150 being the meshing engaging mechanism in this configuration example, the present invention is not limited to the meshing engaging mechanism and it is also possible to mechanically fix the rotation of the first motor generator MG1 by a frictional engaging mechanism, for example.

Configuration of Driving Control Device

A configuration of a vehicle driving control device being one embodiment of the present invention is next described with reference to FIG. 3.

Figure 3:
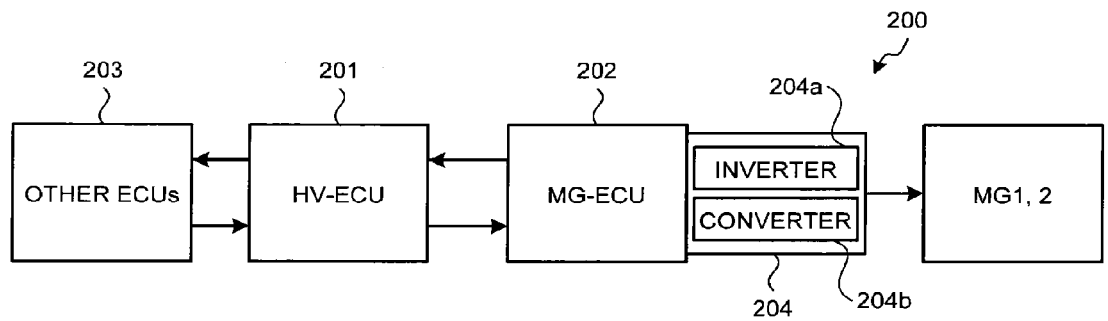
FIG. 3 is a block diagram illustrating a configuration of the vehicle driving control device being one embodiment of the present invention.

FIG. 3 is a block diagram illustrating the configuration of the vehicle driving control device being one embodiment of the present invention. As illustrated in FIG. 3, a vehicle driving control device 200 being one embodiment of the present invention is provided with a HV-ECU 201 and an MG-ECU 202 as main components. The HV-ECU 201 and the MG-ECU 202 act as a control unit according to the present invention.

Each ECU including a CPU, a storage device, an input/output buffer and the like executes various processes such as a lock mechanism control process to be described later. Meanwhile, control executed by each ECU is not limited to a process by software and may also be processed by dedicated hardware (electronic circuit).

The HV-ECU 201 controls operation of a driving device by managing operation of the MG-ECU 201 and other ECUs 203. The other ECUs 203 include an ECB-ECU which controls a brake system, an EFI-ECU which controls an engine and the like, for example.

The MG-ECU 202 controls operation of an MG driving device 204 which drives first and second motor generators MG1 and MG2. The MG driving device 204 is provided with an inverter 204a and a converter 204b. The inverter 204a is formed of a plurality of switching devices and converts direct current to alternating current by switching on/off the switching device. The converter 204b is formed of a plurality of switching devices and converts alternating current to direct current by switching on/off the switching device. The MG driving device 204 acts as an electric motor driving device according to the present invention.

The vehicle driving control device 200 having such configuration improves responsiveness to a release request of a lock mechanism by executing a lock mechanism control process hereinafter described. Operation of the vehicle driving control device 200 when the lock mechanism control process being first to third embodiments of the present invention is executed is hereinafter described with reference to FIGS. 4 to 7.

Lock Mechanism Control Process

First Embodiment

Figure 4:
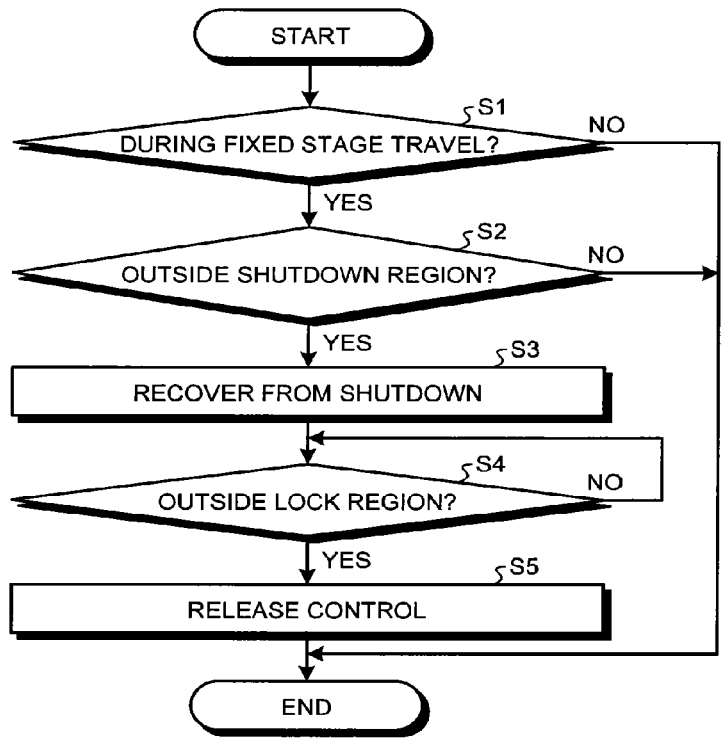
FIG. 4 is a flowchart illustrating a flow of a lock mechanism control process being a first embodiment of the present invention.
Figure 5:
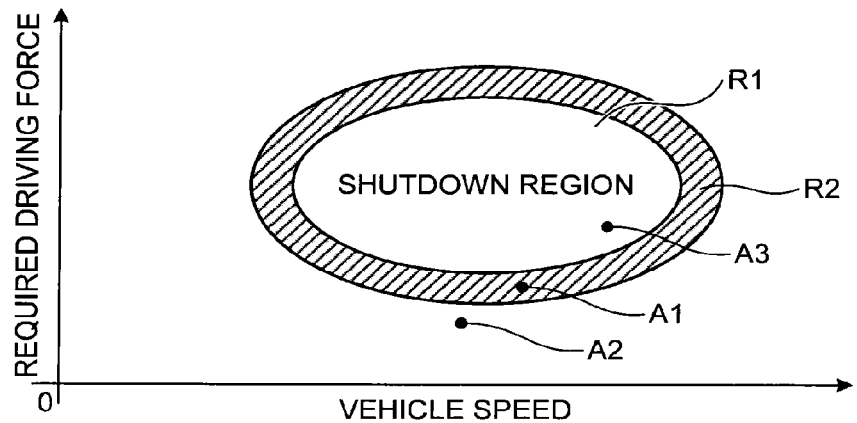
FIG. 5 is a view illustrating an example of a map defining a lock region and a shutdown region.

Operation of a driving control device 200 when a lock mechanism control process being a first embodiment of the present invention is executed is first described with reference to FIGS. 4 and 5. FIG. 4 is a flowchart illustrating a flow of the lock mechanism control process being the first embodiment of the present invention. FIG. 5 is a view illustrating an example of a map defining a lock region and a shutdown region.

The flowchart illustrated in FIG. 4 starts at timing at which an ignition switch of a vehicle is switched from an off state to an on state and the lock mechanism control process shifts to a process at step S1. The lock mechanism control process is repeatedly executed in each predetermined control period while the ignition switch is turned on.

In the process at step S1, a HV-ECU 201 determines whether a current vehicle travel state is a fixed stage travel state. The fixed stage travel state is intended to mean a state to allow the vehicle to travel in a state in which a gear stage of a transmission is fixed by regulating rotation of a first motor generator MG1 by using a lock mechanism and stopping switching operation of an inverter 204a which drives the first motor generator MG1. It is possible to determine whether the current vehicle travel state is the fixed stage travel state by detecting a state of a flag indicating whether the vehicle travel state is the fixed stage travel state, for example. As a result of determination, when the current vehicle travel state is the fixed stage travel state (Yes at step S1), the HV-ECU 201 shifts the lock mechanism control process to a process at step S2. On the other hand, when the current vehicle travel state is not the fixed stage travel state (No at step S1), the HV-ECU 201 finishes a series of lock mechanism control processes.

In the process at step S2, the HV-ECU 201 calculates required driving force to the vehicle based on an output signal of an accelerator pedal which detects an opening degree of the accelerator pedal of the vehicle. Then, the HV-ECU 201 determines whether an operation point corresponding to the required driving force and a vehicle speed detected by a vehicle speed sensor is located outside a shutdown region R1 being an operation region in which the switching operation of the inverter 204a which drives the first motor generator MG1 is stopped in the map illustrated in FIG. 5. As a result of determination, when the operation point is located outside the shutdown region R1 as operation points A1 and A2 illustrated in FIG. 5 (Yes at step S2), the HV-ECU 201 determines that a predetermined condition is satisfied and shifts the lock mechanism control process to a process at step S3. On the other hand, when the operation point is located within the shutdown region R1 as an operation point A3 illustrated in FIG. 5 (No at step S2), the HV-ECU 201 finishes a series of lock mechanism control processes to maintain stop operation of the inverter 204a.

In the process at step S3, the HV-ECU 201 energizes the switching device which forms the inverter 204a to recover from shutdown operation to stop the switching operation of the inverter 204a. According to this, the process at step S3 is completed and the lock mechanism control process shifts to a process at step S4.

In the process at step S4, the HV-ECU 201 calculates the required driving force to the vehicle based on the output signal of the accelerator pedal which detects the opening degree of the accelerator pedal of the vehicle. Then, the HV-ECU 201 determines whether the operation point corresponding to the required driving force and the vehicle speed detected by the vehicle speed sensor is located outside a lock region R2 being an operation region in which the switching operation of the inverter 204a is allowed and fixing operation by the lock mechanism is maintained in the map illustrated in FIG. 5. Then, the HV-ECU 201 shifts the lock mechanism control process to a process at step S5 at timing at which it is determined that the operation point is located outside the lock region R2 as the operation point A2 illustrated in FIG. 5 (Yes at step S4).

Herein, the map illustrated in FIG. 5 is obtained by experiment in consideration of a gear ratio, engine thermal efficiency, system efficiency and the like to be stored in the driving control device in advance. Positions and shapes of the shutdown region R1 and the lock region R2 in the map illustrated in FIG. 5 vary according to engine water temperature, an engine load, catalyst temperature, an engine speed, inverter water temperature and the like. A lowest vehicle speed of the lock region R2 is determined according to engine speed limit.

The HV-ECU 201 releases the fixing operation by the lock mechanism and allows the rotation of the first motor generator MG1 in the process at step S5. The HV-ECU 201 sets the flag indicating whether the vehicle travel state is the fixed stage travel state to an off state. According to this, the process at step S5 is completed and a series of lock mechanism control processes is finished.

As is clear from the above-description, according to the lock mechanism control process being the first embodiment of the present invention, when a predetermined condition is satisfied before the fixing operation by the lock mechanism is released, the HV-ECU 201 recovers the operation of the inverter 204a. According to this, torque of the first motor generator MG1 may be output before release control to release the fixing operation by the lock mechanism, so that responsiveness to a release request of the lock mechanism may be improved.

Second Embodiment

Figure 6:
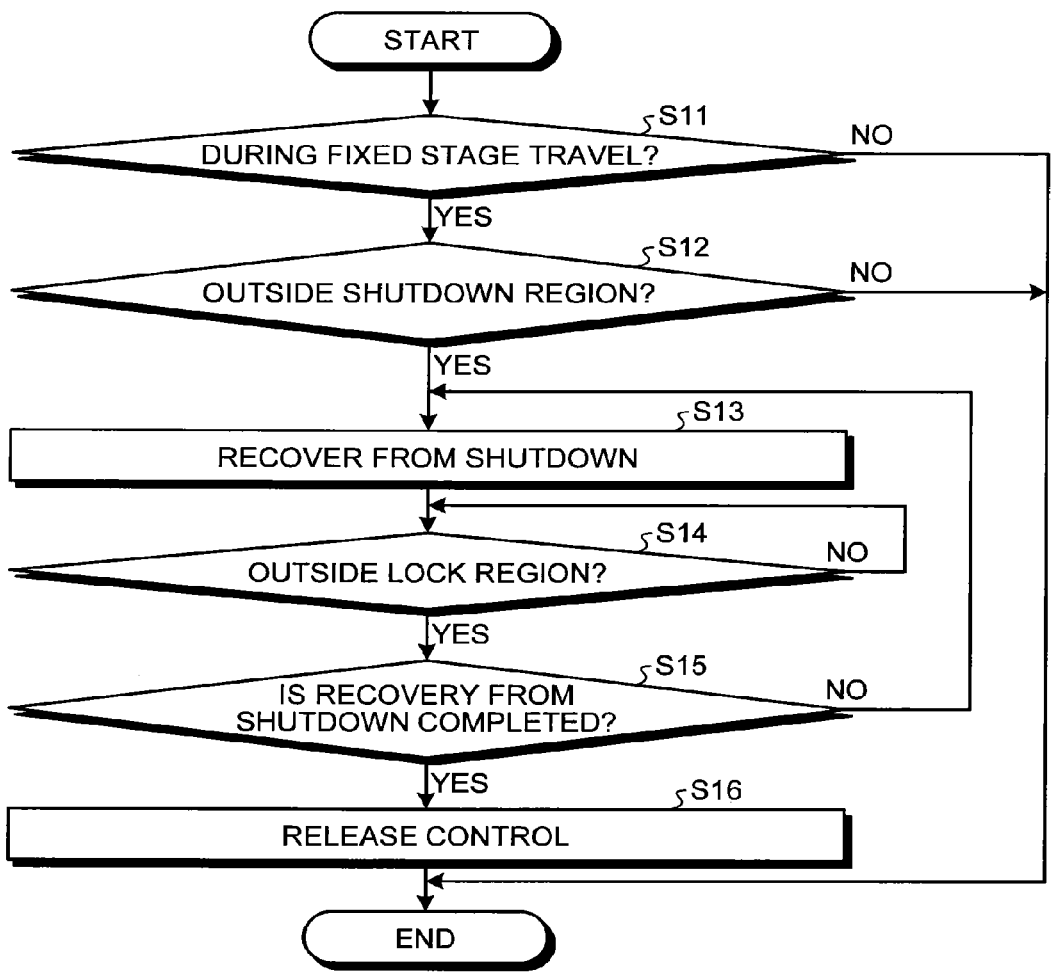
FIG. 6 is a flowchart illustrating a flow of a lock mechanism control process being a second embodiment of the present invention.

Operation of a driving control device 200 when a lock mechanism control process being a second embodiment of the present invention is executed is next described with reference to FIG. 6. FIG. 6 is a flowchart illustrating a flow of the lock mechanism control process being the second embodiment of the present invention.

The flowchart illustrated in FIG. 6 starts at timing at which an ignition switch of a vehicle is switched from an off state to an on state and the lock mechanism control process shifts to a process at step S11. The lock mechanism control process is repeatedly executed in each predetermined control period while the ignition switch is turned on. Meanwhile, contents of processes at steps S11 to S14 are the same as those at steps S1 to S4 illustrated in FIG. 4, so that description thereof is hereinafter omitted and the description is started from a process at step S15.

In the process at step S15, a HV-ECU 201 detects whether energizing operation to a switching device which forms an inverter 204a is completed, thereby determining whether a recovery process from shutdown operation to stop switching operation of the inverter 204a is completed. As a result of determination, when the recovery from the shutdown operation is not completed (No at step S15), the HV-ECU 201 returns the lock mechanism control process to the process at step S13. On the other hand, when the recovery from the shutdown operation is completed (Yes at step S15), the HV-ECU 201 shifts the lock mechanism control process to a process at step S16.

The HV-ECU 201 releases fixing operation by a lock mechanism and allows rotation of a first motor generator MG1 in the process at step S16. The HV-ECU 201 sets the flag indicating whether the vehicle travel state is the fixed stage travel state to an off state. According to this, the process at step S16 is completed and a series of lock mechanism control processes is finished.

As is clear from the above-description, according to the lock mechanism control process being the second embodiment of the present invention, when a condition to release the fixing operation by the lock mechanism is satisfied before operation recovery of the inverter 204a is completed, the HV-ECU 201 releases the fixing operation by the lock mechanism after the operation recovery of the inverter 204a is completed. According to this, it is possible to inhibit decrease in driving force because of the first motor generator MG1 which cannot take on engine reaction force and to inhibit an overload of the inverter 204a by overvoltage due to an increased rotational speed of the first motor generator MG1 by engine blow-up when the fixing operation by the lock mechanism is released before the operation recovery of the inverter 204a is completed.

Third Embodiment

Figure 7:
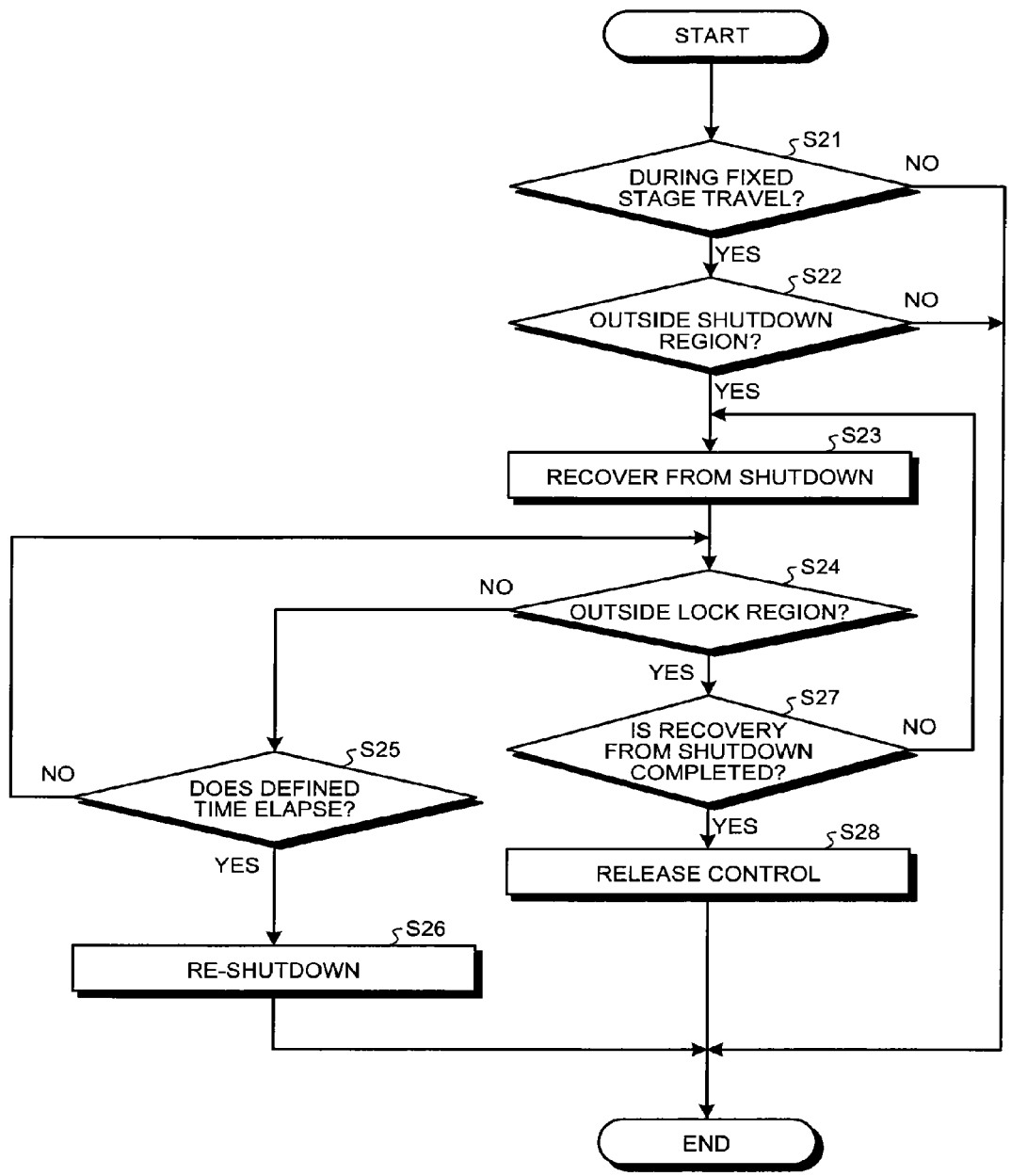
FIG. 7 is a flowchart illustrating a flow of a lock mechanism control process being a third embodiment of the present invention.

Finally, operation of a driving control device 200 when a lock mechanism control process being a third embodiment of the present invention is executed is described with reference to FIG. 7. FIG. 7 is a flowchart illustrating a flow of the lock mechanism control process being the third embodiment of the present invention.

The flowchart illustrated in FIG. 7 starts at timing at which an ignition switch of a vehicle is switched from an off state to an on state and the lock mechanism control process shifts to a process at step S21. The lock mechanism control process is repeatedly executed in each predetermined control period while the ignition switch is turned on. Meanwhile, contents of processes at steps S21 to S23 are the same as those at steps S1 to S3 illustrated in FIG. 4, so that description thereof is hereinafter omitted and the description is started from a process at step S24.

In the process at step S24, the HV-ECU 201 calculates required driving force to the vehicle based on an output signal of an accelerator pedal which detects an opening degree of the accelerator pedal of the vehicle. Then, the HV-ECU 201 determines whether an operation point corresponding to the required driving force and a vehicle speed detected by a vehicle speed sensor is located outside a lock region R2 being an operation region in which switching operation of an inverter 204a is allowed and fixing operation by a lock mechanism is maintained in the map illustrated in FIG. 5. As a result of determination, when the operation point is located outside the lock region R2 as an operation point A2 illustrated in FIG. 5 (Yes at step S24), the HV-ECU 201 shifts the lock mechanism control process to a process at step S27. On the other hand, when the operation point is located within the lock region R2 as an operation point A1 illustrated in FIG. 5 (No at step S24), the HV-ECU 201 shifts the lock mechanism control process to a process at step S25.

In the process at step S25, the HV-ECU 201 determines whether defined time elapses from a time point at which it is determined that the operation point is located within the lock region R2 for the first time. As a result of determination, when the defined time does not elapse (No at step S25), the HV-ECU 201 returns the lock mechanism control process to the process at step S24. On the other hand, when the defined time elapses (Yes at step S25), the HV-ECU 201 shifts the lock mechanism control process to a process at step S26.

In the process at step S26, the HV-ECU 201 stops again the switching operation of the inverter 204a which drives a first motor generator MG1 (re-shutdown). According to this, the process at step S26 is completed and a series of lock mechanism control processes is finished.

In the process at step S27, the HV-ECU 201 detects whether energizing operation to a switching device which forms the inverter 204a is completed, thereby determining whether a recovery process from shutdown operation to stop the switching operation of the inverter 204a is completed. As a result of determination, when the recovery from the shutdown operation is not completed (No at step S27), the HV-ECU 201 returns the lock mechanism control process to the process at step S23. On the other hand, when the recovery from the shutdown operation is completed (Yes at step S27), the HV-ECU 201 shifts the lock mechanism control process to a process at step S28.

The HV-ECU 201 releases the fixing operation by the lock mechanism and allows rotation of the first motor generator MG1 in the process at step S28. The HV-ECU 201 sets the flag indicating whether the vehicle travel state is the fixed stage travel state to an off state. According to this, the process at step S28 is completed and a series of lock mechanism control processes is finished.

As is clear from the above-description, according to the lock mechanism control process being the third embodiment of the present invention, when a condition to release the fixing operation by the lock mechanism is not satisfied even when the defined time elapses after operation recovery of the inverter 204a is completed, the HV-ECU 201 stops the operation of the inverter 204a. According to this, it is possible to improve fuel efficiency of the vehicle when the rotation of the first motor generator MG1 is fixed by the lock mechanism.

Although the embodiments to which the invention achieved by the present inventors is applied are described above, the present invention is not limited by the description and the drawings being a part of the disclosure of the present invention by the embodiments. For example, although the present invention is applied to a hybrid vehicle provided with the electric motor and the engine as the driving devices in the embodiments, the present invention may also be applied to the vehicle provided with a plurality of electric motors as the driving devices. Although the operation stop and operation recovery of the switching operation of the inverter 204a are controlled in the embodiments, when the rotations of both the first and second motor generators MG1 and MG2 are fixed, the operation stop and operation recovery of the switching operation of the converter 204b may be controlled. In this manner, all other embodiments and examples and operation technique carried out by one skilled in the art based on the embodiments are included in the scope of the present invention.

According to the vehicle driving control device, it is possible to output torque of an electric motor before release control to release fixing operation by a lock mechanism, so that it is possible to improve responsiveness to a release request of the lock mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle driving control device for a vehicle, the vehicle including: an engine and an electric motor a as power sources; a differential mechanism whose rotary elements including three rotary elements connected to the engine, the electric motor and a driving shaft, respectively, and performing a differential operation to each another; a rotary engagement element rotating integrally with a rotary element other than the rotary element connected to the engine and the rotary element connected to the driving shaft; a fixed engagement element fixed so as to be unable to rotate; a meshing engaging mechanism selectively fixing the rotary element rotating integrally with the rotary engagement element to be unable to rotate by engaging the rotary engagement element with the fixed engagement element or releasing the engagement of the rotary engagement element with the fixed engagement element; and an electric motor driving device driving the electric motor, the vehicle driving control device comprising:

a control unit configured to stop operation of the electric motor driving device at a time the rotary element is fixed to be unable to rotate, and to recover the operation of the electric motor driving device at a time a predetermined condition based on a parameter relating to a driving of the vehicle is satisfied before releasing the engagement by the engaging mechanism.

2. The vehicle driving control device according to claim 1, wherein the control unit releases the engagement by the engaging mechanism after operation recovery of the electric motor driving device is completed at a time a condition to release the engagement by the engaging mechanism is satisfied before the operation recovery of the electric motor driving device is completed.

3. The vehicle driving control device according to claim 2, wherein the control unit stops the operation of the electric motor driving device at a time the condition to release the engagement by the engaging mechanism is not satisfied even when predetermined time elapses after the operation recovery of the electric motor driving device is completed.

4. The vehicle driving control device according to claim 1, wherein the control unit stops the operation of the electric motor driving device at a time the condition to release the engagement by the engaging mechanism is not satisfied even when predetermined time elapses after the operation recovery of the electric motor driving device is completed.

* * * * *